(12) United States Patent
Wang

(10) Patent No.: US 9,637,149 B1
(45) Date of Patent: May 2, 2017

(54) MULTI-FUNCTION CART

(71) Applicant: Wen-Fa Wang, Taichung (TW)

(72) Inventor: Wen-Fa Wang, Taichung (TW)

( * ) Notice: Subject to any disclaimer, the term of this patent is extended or adjusted under 35 U.S.C. 154(b) by 0 days.

(21) Appl. No.: 15/011,639

(22) Filed: Jan. 31, 2016

(51) Int. Cl.
*B62B 1/00* (2006.01)
*B62B 1/12* (2006.01)

(52) U.S. Cl.
CPC ............... *B62B 1/002* (2013.01); *B62B 1/12* (2013.01)

(58) Field of Classification Search
CPC .. B62B 1/12; B62B 1/002; B62B 1/04; B62B 1/042; B62B 1/08
USPC ...................... 280/641, 43.1, 43.11
See application file for complete search history.

(56) References Cited

U.S. PATENT DOCUMENTS

| | | | | |
|---|---|---|---|---|
| 3,850,441 | A * | 11/1974 | Peters .................. | B62B 1/08 280/47.2 |
| 4,561,674 | A * | 12/1985 | Alessio ................ | B62B 1/002 280/47.21 |
| 4,896,897 | A * | 1/1990 | Wilhelm ............... | B62B 1/002 280/47.2 |
| 4,921,270 | A * | 5/1990 | Schoberg ............. | B62B 1/002 280/47.27 |
| 5,941,543 | A * | 8/1999 | Kazmark, Jr. ....... | B62B 1/002 280/47.29 |
| 6,053,514 | A * | 4/2000 | Su ........................ | B62B 1/12 280/40 |
| 6,308,967 | B1 * | 10/2001 | Stallbaumer ........ | B62B 1/002 280/47.18 |
| 6,328,319 | B1 * | 12/2001 | Stahler, Sr. ......... | B62B 1/002 280/47.18 |
| 6,364,328 | B1 * | 4/2002 | Stahler, Sr. ......... | B62B 1/002 280/47.18 |
| 6,588,775 | B2 * | 7/2003 | Malone, Jr. ......... | B62B 1/002 280/47.18 |
| 6,880,835 | B2 * | 4/2005 | Tornabene ........... | B62B 1/002 182/20 |
| 6,883,824 | B2 * | 4/2005 | Yang ..................... | B62B 1/042 280/47.26 |
| 6,929,250 | B2 * | 8/2005 | Blake .................... | B62B 1/002 254/122 |
| 6,938,905 | B1 * | 9/2005 | Tsai ...................... | B62B 1/002 280/30 |
| 7,044,484 | B2 * | 5/2006 | Wang .................... | B62B 1/125 280/40 |
| 7,600,765 | B2 * | 10/2009 | Tsai ...................... | B62B 1/002 280/47.18 |
| 8,100,417 | B2 * | 1/2012 | Tsai ...................... | B62B 1/002 280/47.18 |

(Continued)

*Primary Examiner* — Hau Phan
*Assistant Examiner* — Jacob Meyer
(74) *Attorney, Agent, or Firm* — Rosenberg, Klein & Lee

(57) ABSTRACT

A cart includes a first frame having two side tubes and each of the two side tubes has a first wheel connected thereto. A second frame is pivotably connected to the first frame and has a transverse tube. Two second wheels are connected to the transverse tube. A locking device is slidably connected to the first frame so as to be positioned at a first position or a second position. When the locking device is set at the first position, the second frame is pivoted to a position substantially parallel to the first frame, and the first wheels support the cart. When the locking device is set at the second position, the second frame is pivoted to a position substantially perpendicular to the first frame. The first and second wheels support the cart.

7 Claims, 8 Drawing Sheets

(56) References Cited

U.S. PATENT DOCUMENTS

| | | | |
|---|---|---|---|
| 8,100,430 B2 * | 1/2012 | Meyers | B62B 1/002 280/30 |
| 8,454,033 B2 * | 6/2013 | Tsai | B62B 1/002 280/47.18 |
| 8,465,046 B2 * | 6/2013 | Meyers | B62B 1/002 280/30 |
| 8,602,444 B2 * | 12/2013 | Chang | B62B 1/12 280/651 |
| 8,764,046 B2 * | 7/2014 | Baldemor | B62B 1/002 280/47.29 |
| 9,096,249 B2 * | 8/2015 | Gibson | B62B 1/002 |
| 9,150,233 B2 * | 10/2015 | Su | B62B 3/022 |
| D749,812 S * | 2/2016 | Gibson | D34/26 |
| 9,327,745 B2 * | 5/2016 | Tsai | B62B 1/042 |
| 9,358,994 B1 * | 6/2016 | Yang | B62B 1/12 |
| 9,365,225 B2 * | 6/2016 | Henao | B62B 3/02 |
| 2004/0201186 A1 * | 10/2004 | Tornabene | B62B 1/002 280/30 |
| 2008/0054581 A1 * | 3/2008 | Voth | B62B 1/08 280/40 |
| 2008/0197590 A1 * | 8/2008 | Tsai | B62B 1/002 280/47.18 |
| 2012/0153585 A1 * | 6/2012 | Ryan | B62B 1/002 280/47.18 |
| 2012/0153587 A1 * | 6/2012 | Ryan | B62B 1/12 280/47.27 |
| 2012/0242063 A1 * | 9/2012 | Bruckner | B62B 1/002 280/651 |
| 2013/0328279 A1 * | 12/2013 | Feick | B62B 3/00 280/47.18 |
| 2015/0203136 A1 * | 7/2015 | Wang | B62B 1/045 280/47.29 |
| 2016/0075358 A1 * | 3/2016 | Simon | B62B 5/066 280/40 |
| 2016/0236699 A1 * | 8/2016 | Wang | B62B 1/12 |

* cited by examiner

MULTI-FUNCTION CART

BACKGROUND OF THE INVENTION

1. Fields of the Invention

The present invention relates to a cart, and more particularly, to a cart with first and second frames, and the second frame is pivotable relative to the first frame to change the way of use of the cart.

2. Descriptions of Related Art

The conventional cart used for transportation of goods usually includes two wheels or four wheels. The cart with two wheels is for upright use and generally is smaller than that with four wheels. The cart with four wheels can take more goods on it. The users have to decide which cart is to be used, or the users have to purchase both of them for different types of tasks. The two different types of carts spend a lot of money and occupy a larger space.

U.S. Pat. No. 7,513,511 discloses a cart with four wheels, and the handle can be installed at different positions so as to use the cart by two wheels or four wheels. The handle is directly inserted into a connection tube so that the handle is not stable and may drop or disengaged from the connection tube during use.

U.S. Pat. No. 6,308,967 discloses another cart whose handle is pivotably connected to a central frame by a support frame. The handle can be extended relative to the support frame and is secured by using a hooking device. The handle can also be used in two different positions, however, the hooking device cannot firmly position the handle.

The present invention intends to provide a multi-function cart which improves the shortcomings mentioned above.

SUMMARY OF THE INVENTION

The present invention relates to a cart and comprises a first frame which has two side tubes, and each of the two side tubes has a first wheel pivotably connected the outside thereof. A second frame is pivotably connected to the first frame and has a transverse tube. Two second wheels are connected to the transverse tube. A locking device is slidably connected to the first frame and positioned one of a first position and a second position. When the locking device is set at the first position, the second frame is pivoted to a position substantially parallel to the first frame and the first wheels support the cart. The second wheels are located above the first wheels and do not touch the ground. When the locking device is set at the second position, the second frame is pivoted to a position substantially perpendicular to the first frame, and the first and second wheels support the cart.

Preferably, the locking device has a seat, a pull rod, two arms and two positioning tubes. The seat is slidably connected between the two side tubes. The two arms each have a first end pivotably connected to the first end of the pull rod, and the two arms each have a second end pivotably connected to the first end of the positioning tube corresponding thereto. A spring is mounted to the pull rod and the second end of the pull rod extends through the seat. The spring is biased between a part at the first end of the pull rod and an inside of the seat. The second end of each of the positioning tubes is selectively engaged with the side tube corresponding thereto to set the first position and the second position.

Preferably, the locking device has two links, and two ends of each link are respectively and pivotably connected to the seat and the second frame.

Preferably, the seat has two passages defined in two ends thereof. The two side tubes movably extend through the two passages respectively. The seat has a room to accommodate the pull rod, the arms, the positioning tubes and the spring. A cover is connected to the seat to close the room. The seat has two notches defined in the top thereof. Each link has one end thereof engaged with the notch corresponding thereto.

Preferably, the second frame has two pivotal tubes and two folding tubes which are pivotably connected to the pivotal tubes so that the folding tubes are pivoted relative to the pivotal tubes.

Preferably, the second frame has two sleeves slidably connected thereto. When the sleeves move to connection portions between the two pivotal tubes and the two folding tubes, the folding tubes cannot be pivoted relative to the pivotal tubes. When the sleeves move to the two folding tubes, the folding tubes are able to be pivoted relative to the pivotal tubes.

Preferably, the second end of the pull rod that extends through the seat has a knob.

Preferably, the side tubes each have a first hole and a second hole. The second end of each of the positioning tubes is selectively engaged with the first hole corresponding thereto so as to set the first position. The second end of each of the positioning tubes is selectively engaged with the second hole corresponding thereto so as to set the second position.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
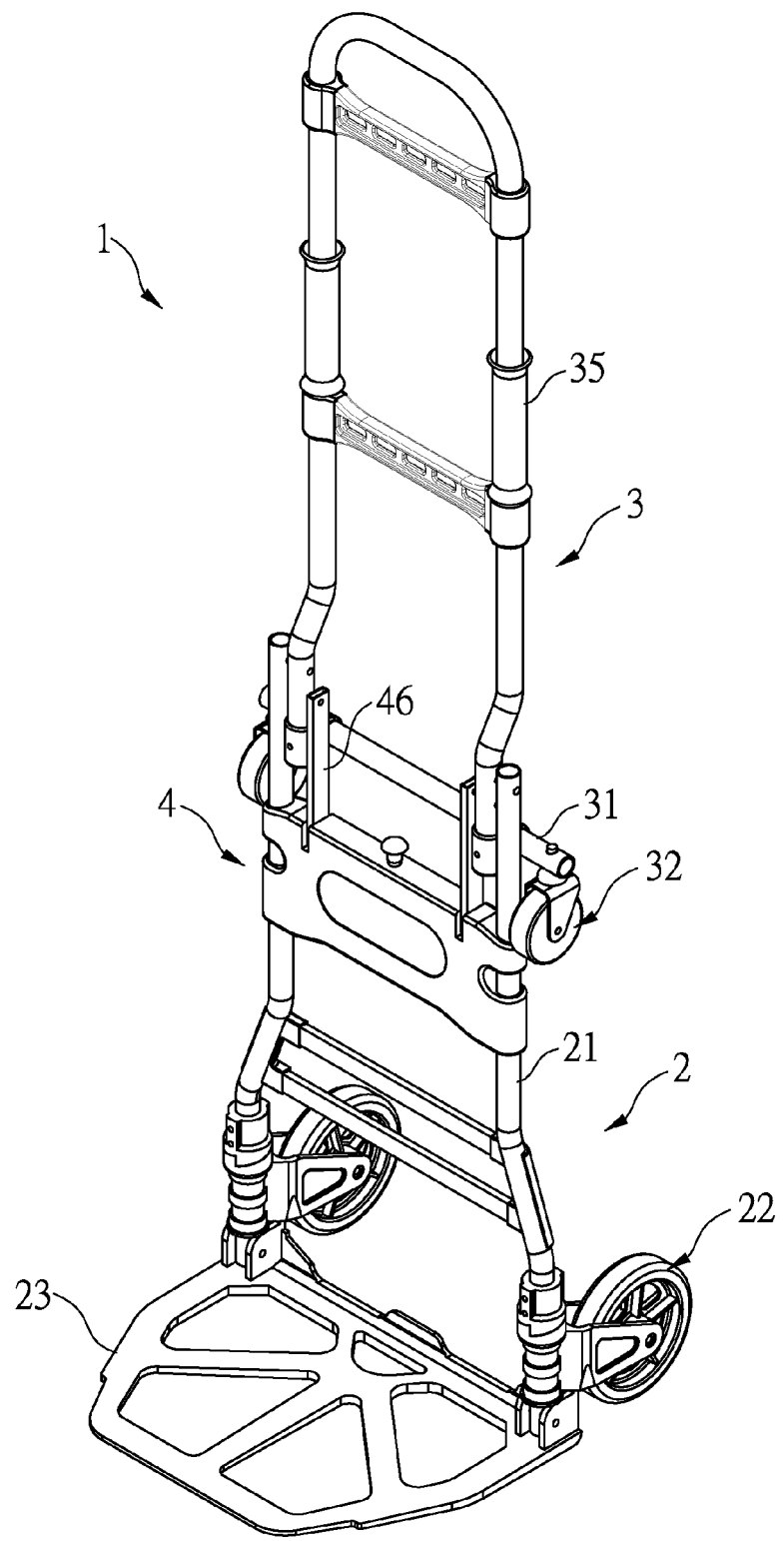
FIG. 1 is an exploded view of the cart of the present invention, wherein only the two first wheels support the cart.
Figure 2:
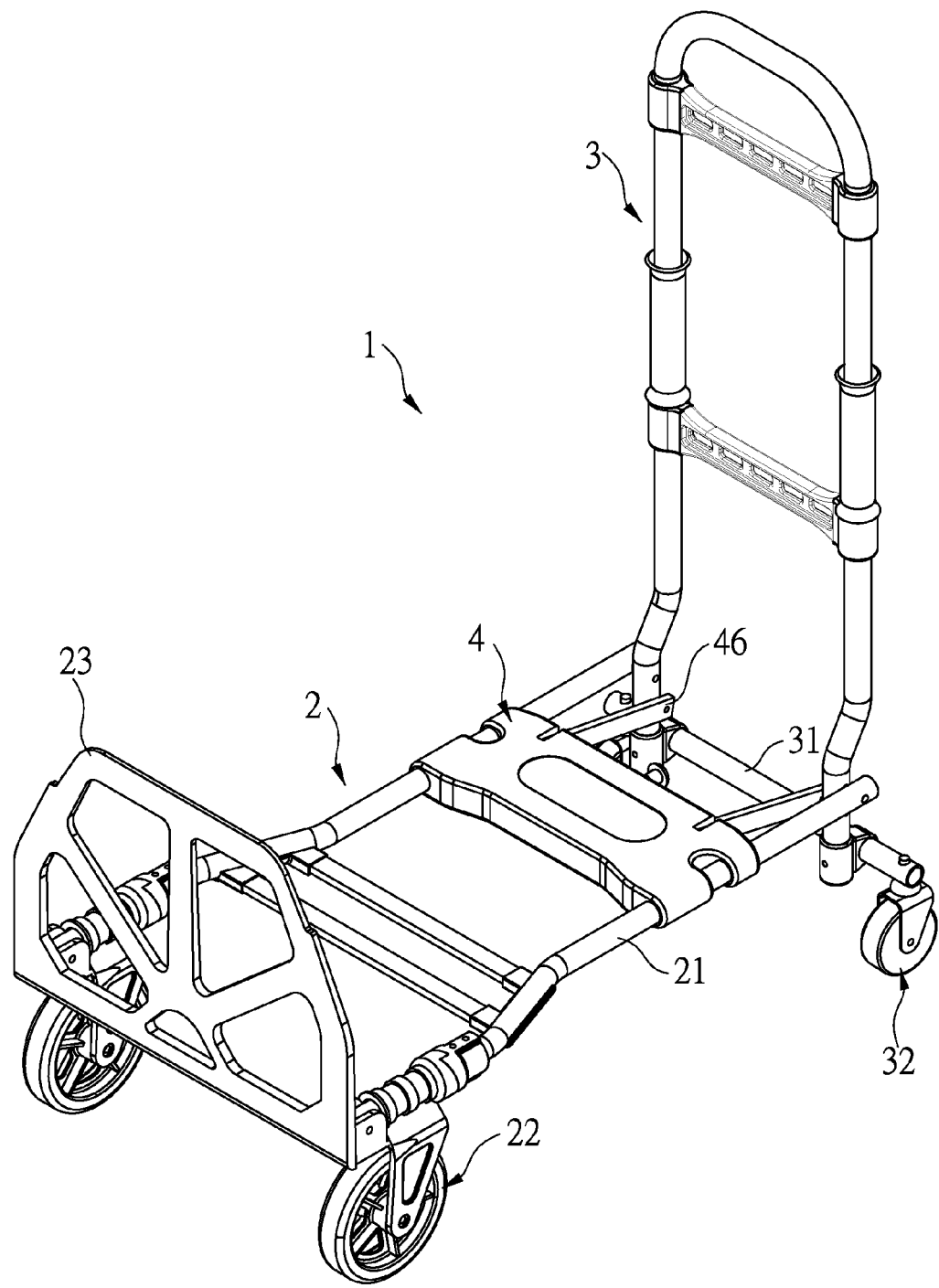
FIG. 2 is a perspective view to show the cart of the present invention, wherein the two first wheels and the two second wheels support the cart.

Referring to FIGS. 1 to 4, the cart 1 of the present invention can be used as a two-wheel cart as shown in FIG. 1, or as a four-wheel cart as shown in FIG. 2. The cart 1 of the present invention comprises a first frame 2, a second frame 3 and a locking device 4.

The first frame 2 has two side tubes 21, and each of the two side tubes 21 has a first wheel 22 pivotably connected the outside thereof. A support plate 23 is pivotably connected to the first end of the first frame 2 and between the two side tubes 21. The support plate 23 is pivoted to be perpendicular to the first frame 2 so as to carry goods thereon.

The second frame 3 is pivotably connected to the second end of the first frame 2 and has a transverse tube 31. Two second wheels 32 are connected to the transverse tube 31 and located on two sides of the second frame 3.

The locking device 4 is slidably connected to the first frame 2 and can be positioned at one of a first position and a second position. When the locking device 4 is set at the first position, the second frame 3 is pivoted to a position substantially parallel to the first frame 2 and the first wheels 22 support the cart 1. The second wheels 32 are located above the first wheels 22 and do not touch ground. When the locking device 4 is set at the second position, the second frame 3 is pivoted to a position substantially perpendicular to the first frame 2, and the first and second wheels 22, 32 support the cart 1.

Specifically, the seat 41 has two passages 411 defined in two ends thereof. The two side tubes 21 movably extend through the two passages 411 respectively. The locking device 4 has a seat 41, a pull rod 42, two arms 43 and two positioning tubes 44. The seat 41 is slidably connected between the two side tubes 21. The two arms 43 each have a first end pivotably connected to the first end of the pull rod 42, and the two arms 43 each have a second end pivotably connected to the first end of the positioning tube 44 corresponding thereto. A spring 47 is mounted to the pull rod 42 and the second end of the pull rod 42 extends through the seat 41. The spring 47 is biased between an inverted U-shaped part at the first end of the pull rod 42 and an inside of the seat 41. The second end of the pull rod 42 that extends through the seat 41 has a knob 48. The seat 41 has a room 412 to accommodate the pull rod 42, the arms 43, the positioning tubes 44 and the spring 47. A cover 45 is connected to the seat 41 to close the room 412.

Figure 3:
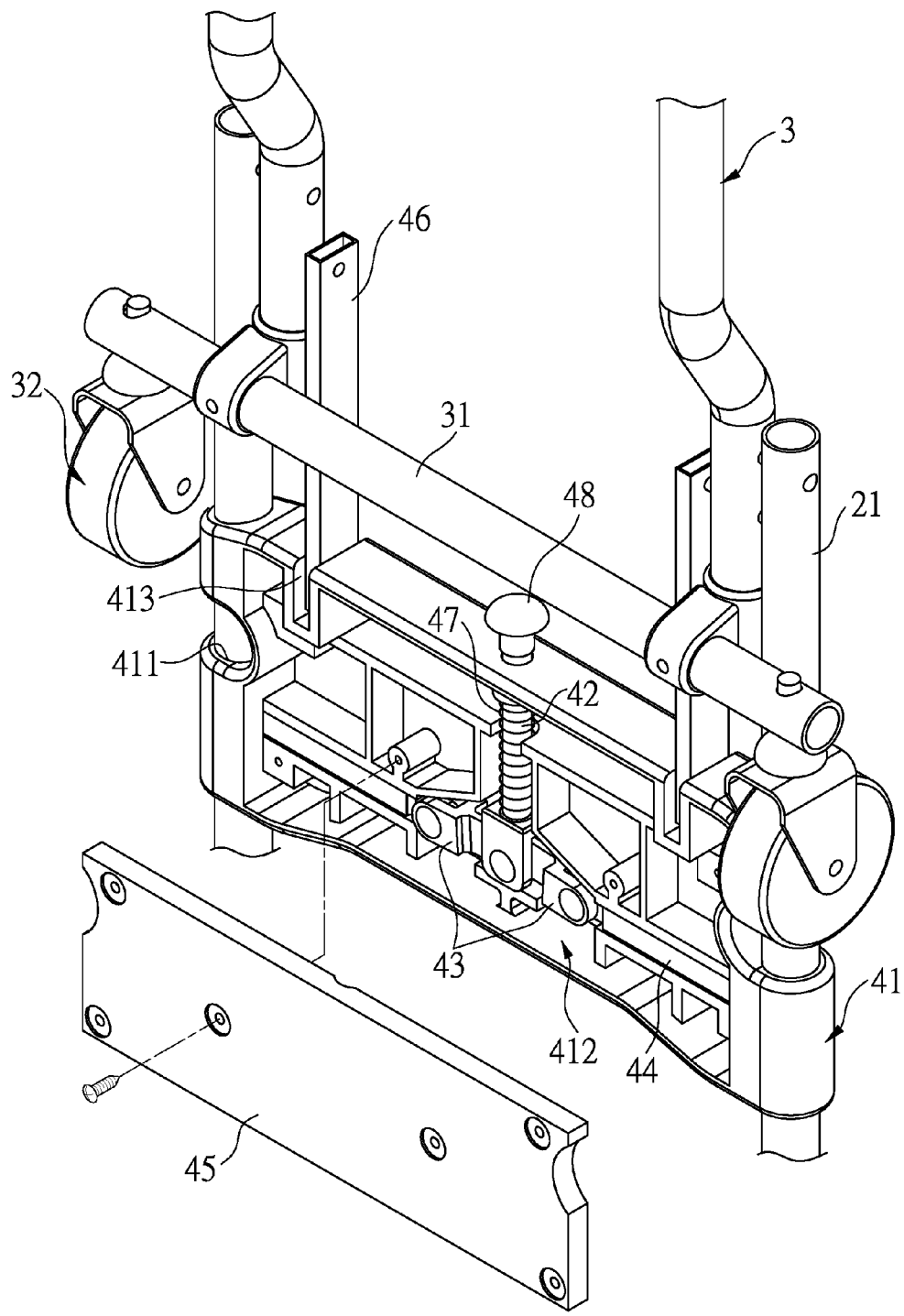
FIG. 3 is a perspective view to show the locking device of the cart of the present invention.
Figure 4:
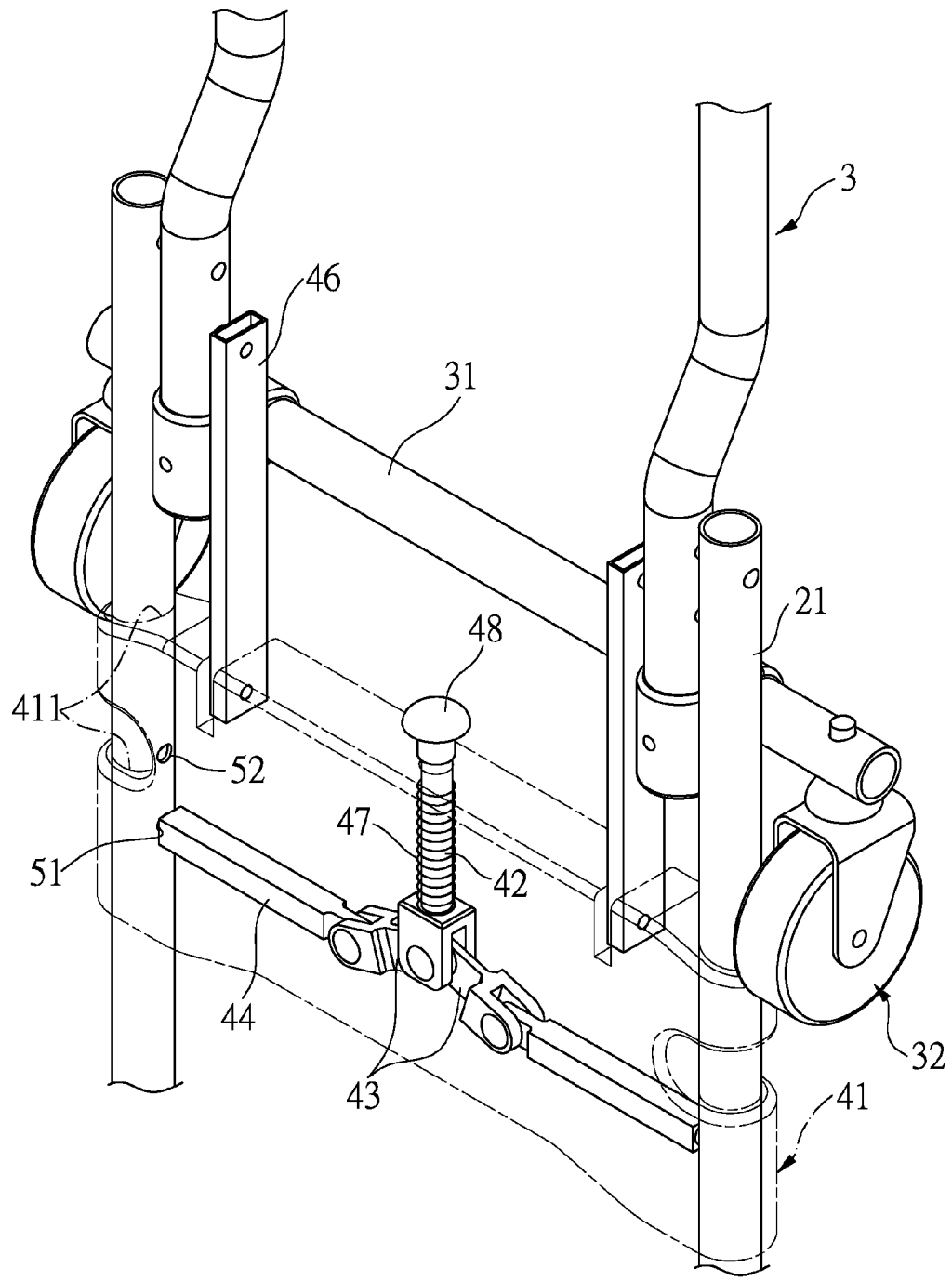
FIG. 4 shows that the locking device of the cart of the present invention is set at the first position.
Figure 5:
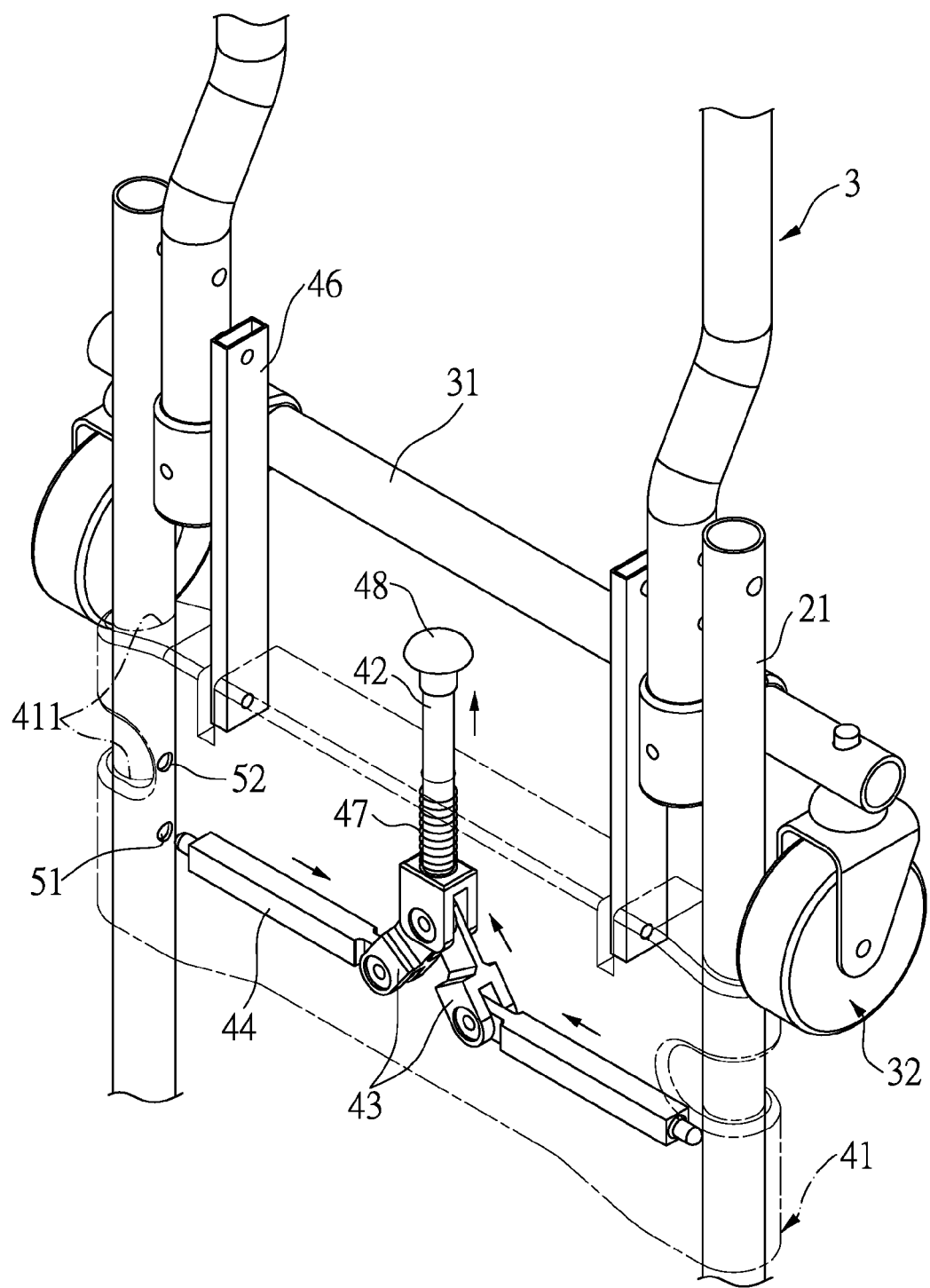
FIG. 5 shows that the pull rod is pulled upward to release the locking device of the cart of the present invention.
Figure 6:
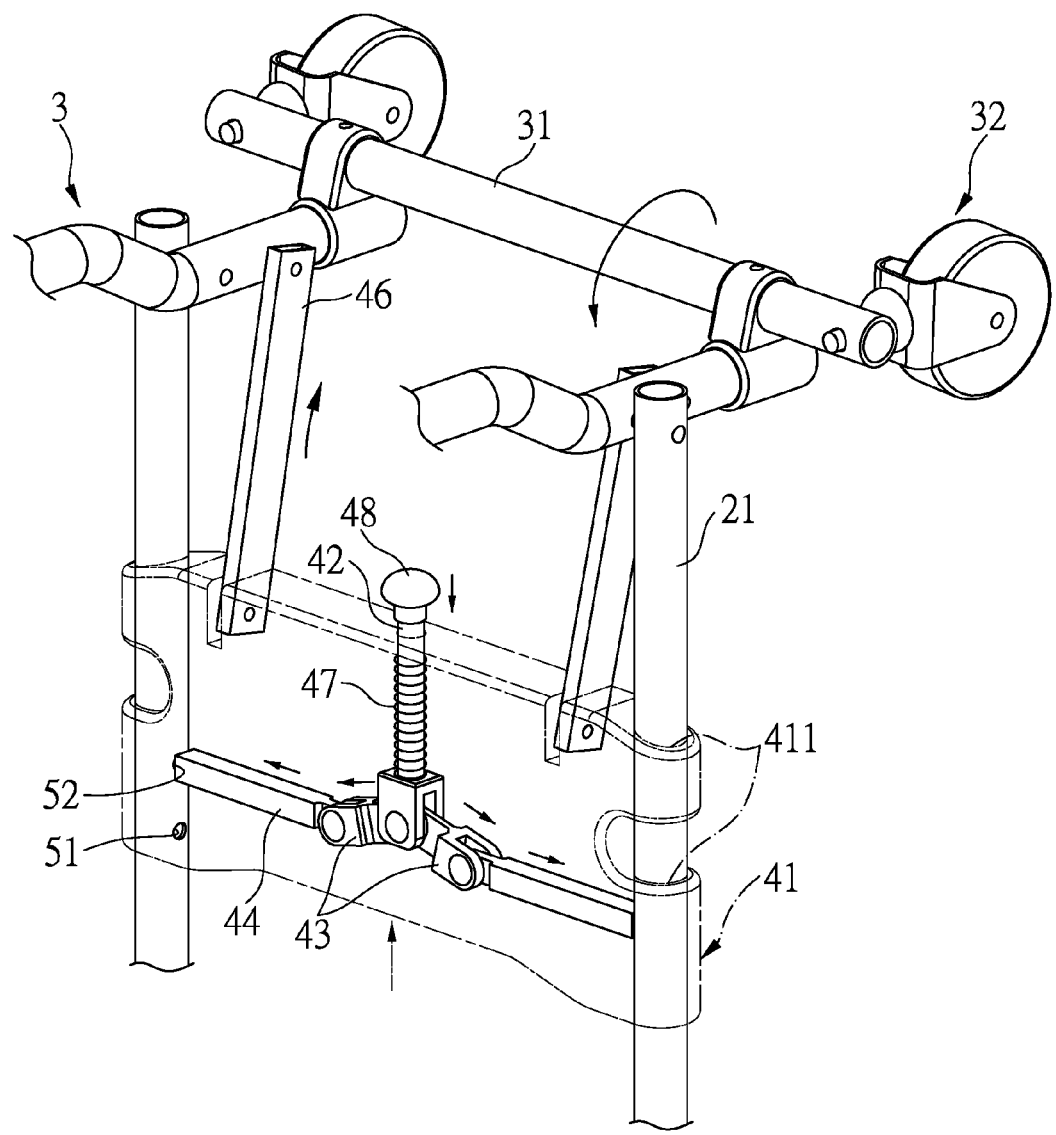
FIG. 6 shows that the locking device of the cart of the present invention is set at the first position.

The side tubes 21 each have a first hole 51 and a second hole 52 as shown in FIGS. 4 and 5, the second end of each of the positioning tubes 44 is selectively engaged with the first hole 51 corresponding thereto to set the first position as shown in FIG. 4, and the second end of each of the positioning tubes 44 is selectively engaged with the second hole 52 corresponding thereto to set the second position as shown in FIG. 6. The locking device 4 has two links 46, and two ends of each link 46 are respectively and pivotably connected to the seat 41 and the second frame 3. The seat 41 further has two notches 413 defined in the top thereof as shown in FIG. 3, and each link 46 has one end thereof engaged with the notch 413 corresponding thereto.

The second frame 3 has two pivotal tubes 33 and two folding tubes 34 which are pivotably connected to the pivotal tubes 33 so that the folding tubes 34 are pivoted relative to the pivotal tubes 33. Specifically, the second frame 3 has two sleeves 35 slidably connected thereto. When the sleeves 35 move to connection portions between the two pivotal tubes 33 and the two folding tubes 34, the folding tubes 34 cannot be pivoted relative to the pivotal tubes 33 as shown in FIGS. 1 and 2. When the sleeves 35 move to the two folding tubes 34, the folding tubes 34 are pivoted relative to the pivotal tubes 33 as shown in FIGS. 7 and 8.

As shown in FIGS. 4 to 6, when the cart 1 is transformed from a two-wheel cart (FIG. 1) to a four-wheel cart (FIG. 2), the user pulls the knob 48 that is exposed beyond the seat 41 toward the second frame 3, and the spring 47 mounted to the pull rod 42 is compressed. Therefore, the arms 43 are pivoted upward, and the positioning tubes 44 are retracted horizontally so as to disengage from the first holes 51 of the side tubes 21 as shown in FIG. 5. The user then pulls the second frame 3 by lifting the transverse tube 31 and pivots the second frame 3 relative to the first frame 2. The second frame 3 drives the seat 41 to move upward, during the process, the side tubes 21 maintain the two positioning tubes 44 at retracted status until the two positioning tubes 44 are moved to the second holes 52. The spring 47 bounces back to pulls the pull rod 42 downward, and the two arms 43 are pivoted by the force from the spring 47 to engage the two positioning tubes 44 with the second holes 52 as shown in FIG. 6. The second frame 3 is pivoted an angle relative to the first frame 2. The first wheel 22 the first frame 2 and the second wheels 32 on the second frame 3 contact the ground and support the cart 1. When transforming the four-wheel cart into the two-wheel cart, the above mentioned steps are operated in reverse sequences.

Figure 7:
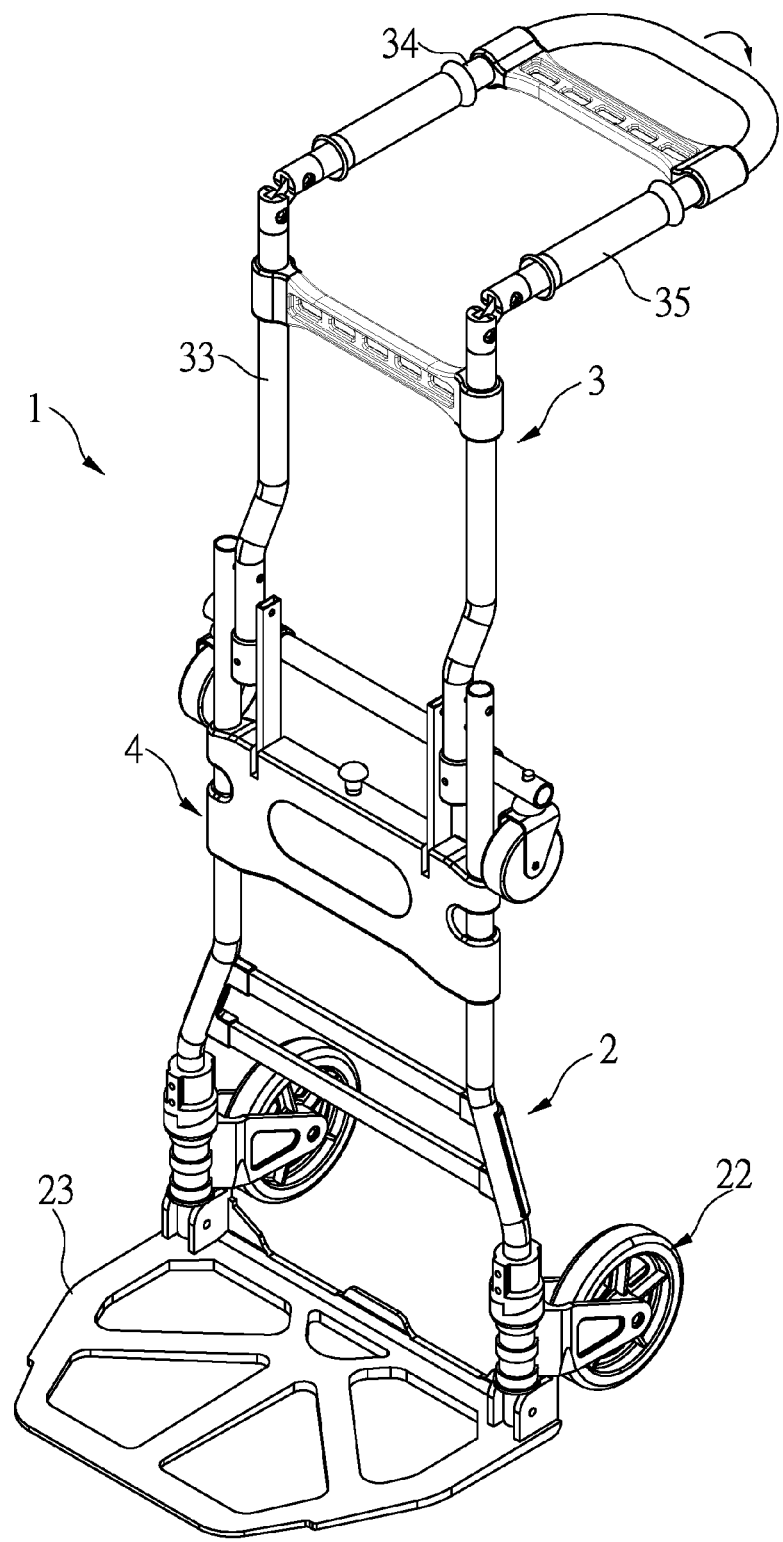
FIG. 7 shows that the sleeves move to the folding tubes and the folding tubes are pivoted relative to the pivotal tubes.
Figure 8:
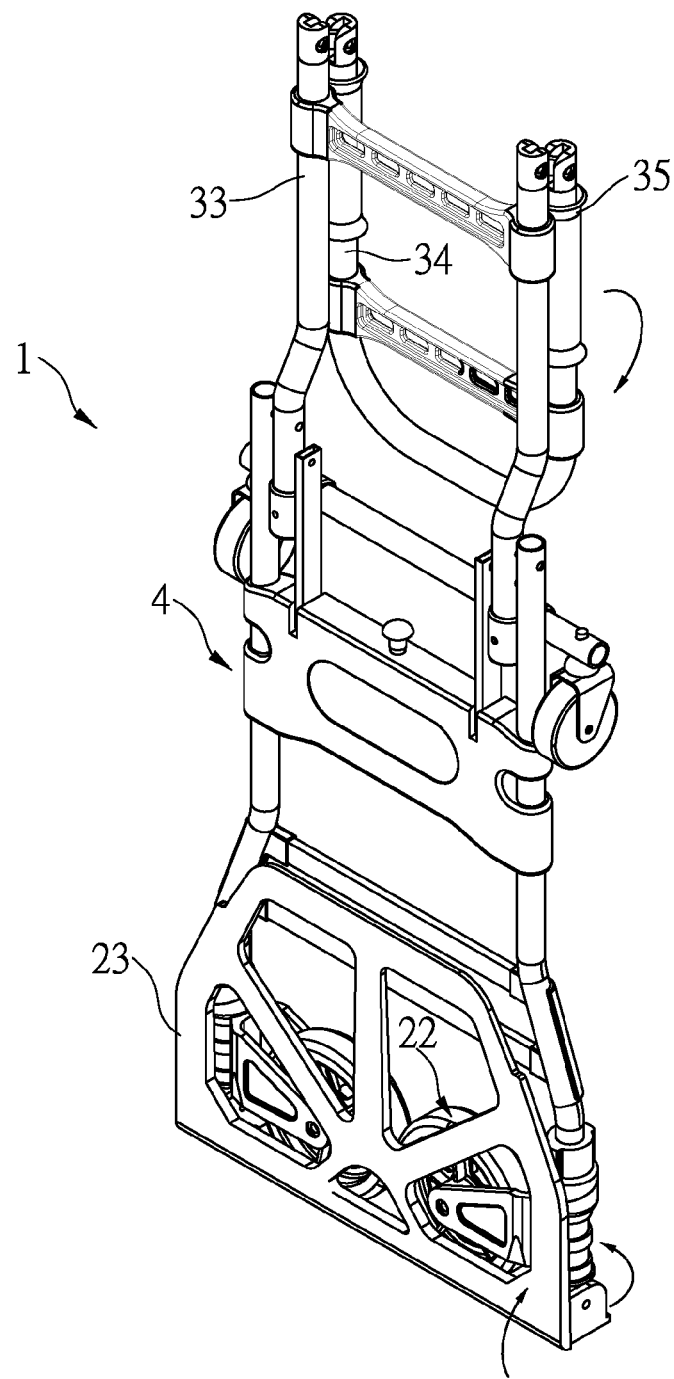
FIG. 8 shows that the folding tubes are pivoted toward the pivotal tubes, and the support plate is pivoted toward the first frame.

As shown in FIGS. 1, 7 and 8, when the cart 1 is not in use, the sleeves 35 are moved to the two folding tubes 34, the folding tubes 34 are able to be pivoted relative to the pivotal tubes 33 and are located parallel to the pivotal tubes 33 as shown in FIGS. 7 and 8. The support plate 23 is folded to be parallel to the first frame 2 and the two first wheels 22 are pivoted toward. The second wheels 32 are located on two sides of the second frame 32 and do not protrude too much from either side of the second frame 3. The cart 1 is in its folded status which occupies less space for convenience of storage.

While we have shown and described the embodiment in accordance with the present invention, it should be clear to those skilled in the art that further embodiments may be made without departing from the scope of the present invention.

What is claimed is:
1. A cart comprising:
a first frame having two side tubes, each of the two side tubes having a first wheel pivotably connected to an outside thereof;
a second frame pivotably connected to the first frame and having a transverse tube, two second wheels connected to the transverse tube, and
a locking device slidably connected to the first frame and being positioned at one of a first position and a second position, the locking device having a seat, a pull rod, two arms and two positioning tubes, the seat slidably connected between the two side tubes, the two arms each having a first end pivotably connected to a first end of the pull rod, and the two arms each having a second end pivotably connected to a first end of the positioning tube corresponding thereto, a spring mounted to the pull rod, a second end of the pull rod extending through the seat, the spring being biased between a part at the first end of the pull rod and an inside of the seat, a second end of each of the positioning tubes being selectively engaged with the side tube corresponding thereto to set the first position and the second position, when the locking device is set at the first position, the second frame is pivoted to a position substantially parallel to the first frame and the first wheels support the cart, the second wheels are located above the first wheels and do not touch ground, when the locking device is set at the second position, the second frame is pivoted to a position substantially perpendicular to the first frame, and the first and second wheels support the cart.

2. The cart as claimed in claim 1, wherein the locking device has two links and two ends of each link are respectively and pivotably connected to the seat and the second frame.

3. The cart as claimed in claim 2, wherein the seat has two passages defined in two ends thereof, the two side tubes movably extend through the two passages respectively, the seat has a room to accommodate the pull rod, the arms, the positioning tubes and the spring, a cover is connected to the seat to close the room, the seat has two notches defined in a top thereof, each link has one end thereof engaged with the notch corresponding thereto.

4. The cart as claimed in claim 2, wherein the second frame has two pivotal tubes and two folding tubes which are pivotably connected to the pivotal tubes so that the folding tubes are pivoted relative to the pivotal tubes.

5. The cart as claimed in claim 4, wherein the second frame has two sleeves slidably connected thereto, when the sleeves move to connection portions between the two pivotal tubes and the two folding tubes, the folding tubes cannot be pivoted relative to the pivotal tubes, when the sleeves move to the two folding tubes, the folding tubes are pivoted relative to the pivotal tubes.

6. The cart as claimed in claim 1, wherein the second end of the pull rod that extends through the seat has a knob.

7. The cart as claimed in claim 1, wherein the side tubes each have a first hole and a second hole, the second end of each of the positioning tubes is selectively engaged with the first hole corresponding thereto to set the first position, the second end of each of the positioning tubes is selectively engaged with the second hole corresponding thereto to set the second position.

\* \* \* \* \*